United States Patent [19]
Benny

[11] 3,822,673
[45] July 9, 1974

[54] WATER FLUSHING EXCRETA REMOVAL SYSTEM FOR ANIMAL HOUSING SYSTEMS

[75] Inventor: John R. Benny, Cincinnati, Ohio

[73] Assignee: Hoeltge, Inc., Cincinnati, Ohio

[22] Filed: Feb. 16, 1973

[21] Appl. No.: 333,353

[52] U.S. Cl. .................................. 119/22, 119/19
[51] Int. Cl. ............................................. A01k 1/02
[58] Field of Search ...................... 119/22, 18, 1, 19

[56] References Cited
UNITED STATES PATENTS
| | | | |
|---|---|---|---|
| 2,585,698 | 2/1952 | Spring................................ | 119/22 |
| 3,244,147 | 4/1966 | Kogeichi et al...................... | 119/18 |
| 3,734,057 | 5/1973 | Lee et al.............................. | 119/1 |

*Primary Examiner*—Hugh R. Chamblee
*Attorney, Agent, or Firm*—John W. Melville; Albert E. Strasser; Stanley H. Foster

[57] ABSTRACT

A water flushing excreta removal system for animal housing systems of the type having at least one tier of cubicles and an inclined surface disposed beneath the cubicles of each tier adapted to catch debris from the cubicles and provided with flush water supply means for the removal of the debris. The flush water supply means includes a flush tube suspended over the front of the inclined surface to generate a slow moving, well distributed flushing pattern over the inclined surface. A water flushing solenoid valve is connected by flexible hose to the flush tube. A supply manifold, which includes one branch for each tier of cubicles, with the branch connected to the solenoid valve, is connected to a source of water supply. A throttle-shut-off valve is located upstream of the supply manifold and control means are provided which will furnish timed sequential energization of the water flushing solenoid valves, permitting adjustment of the time interval between flush cycles, the length of tier flush time, and selection of various modes of operation.

7 Claims, 10 Drawing Figures

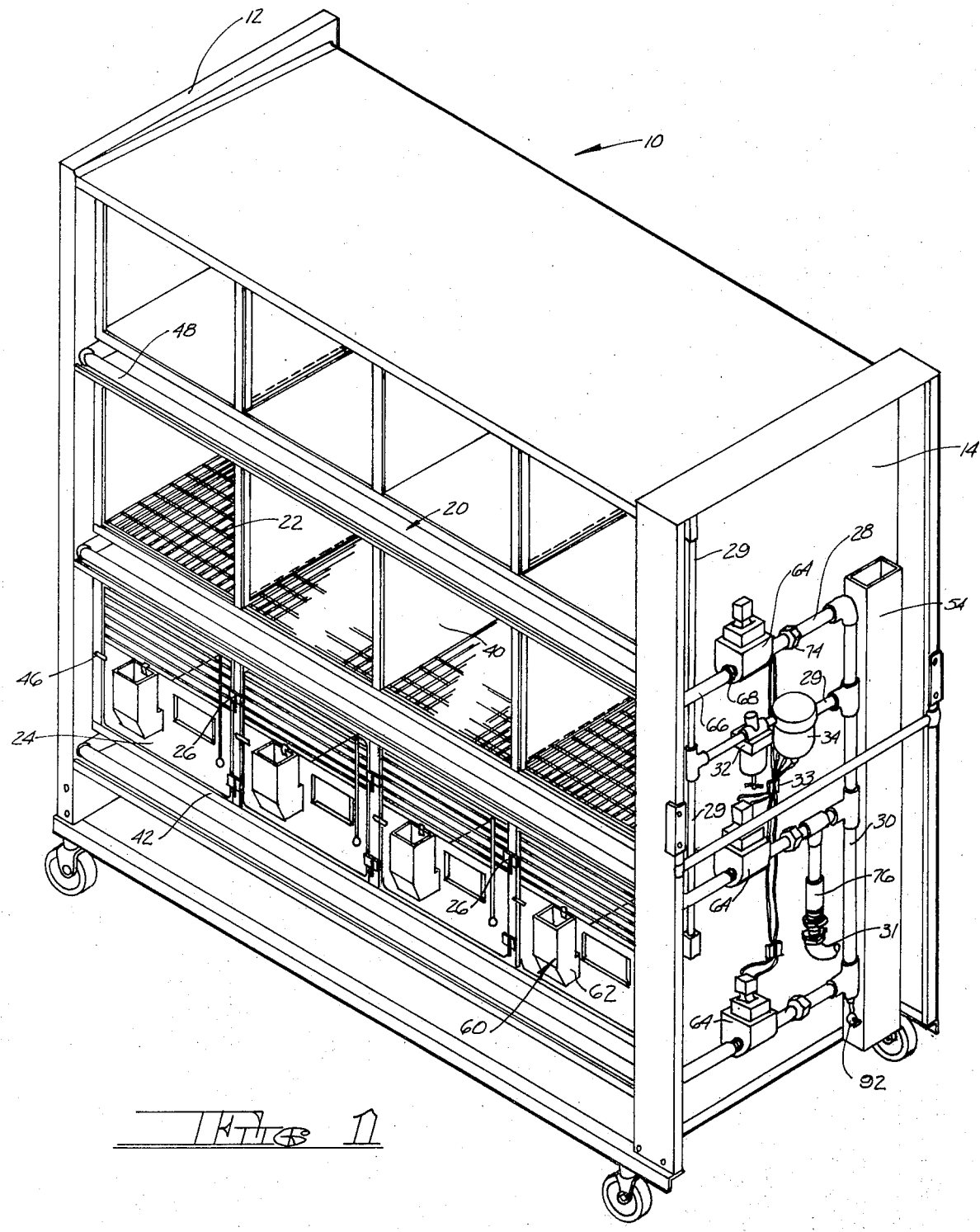

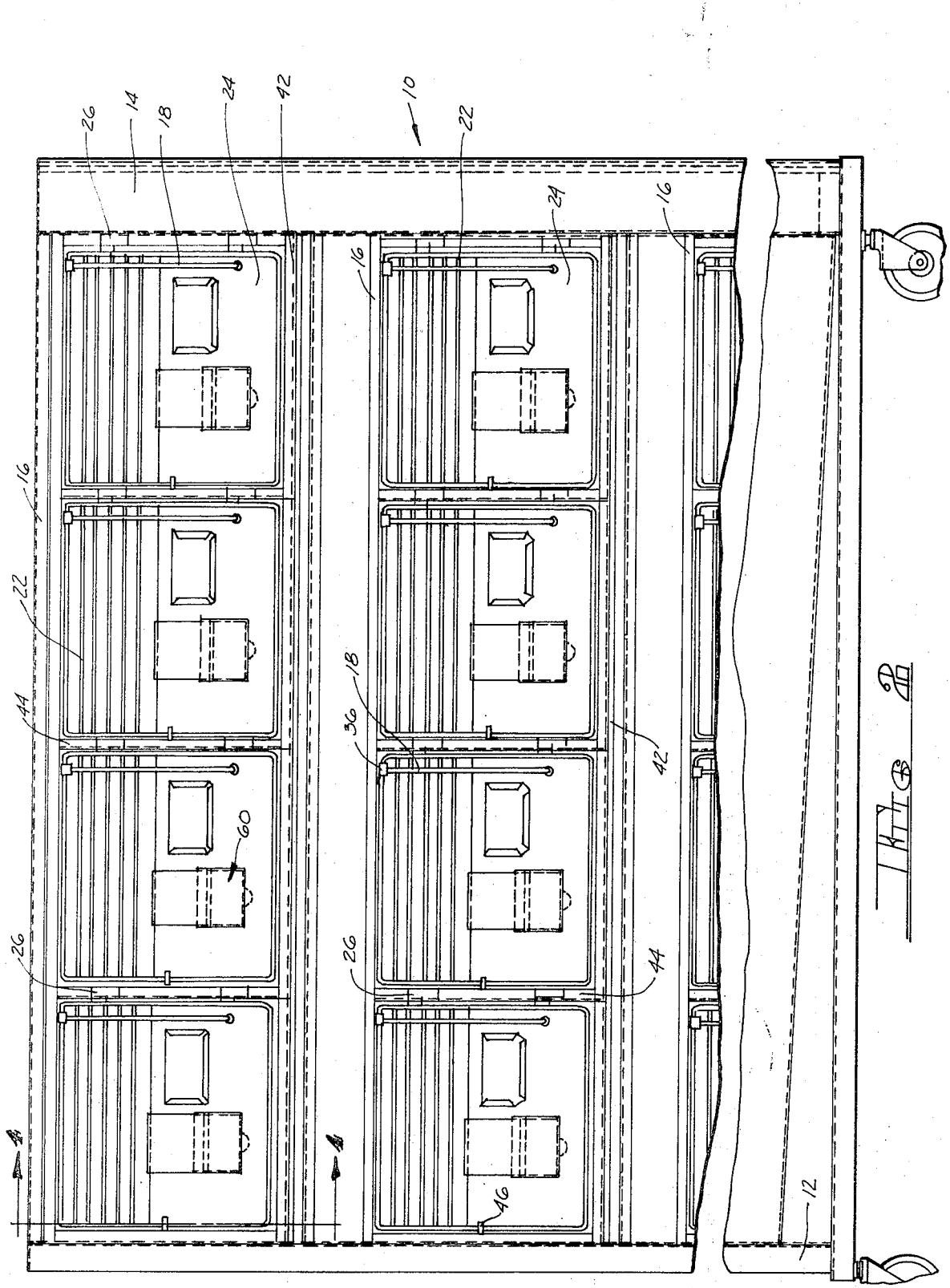

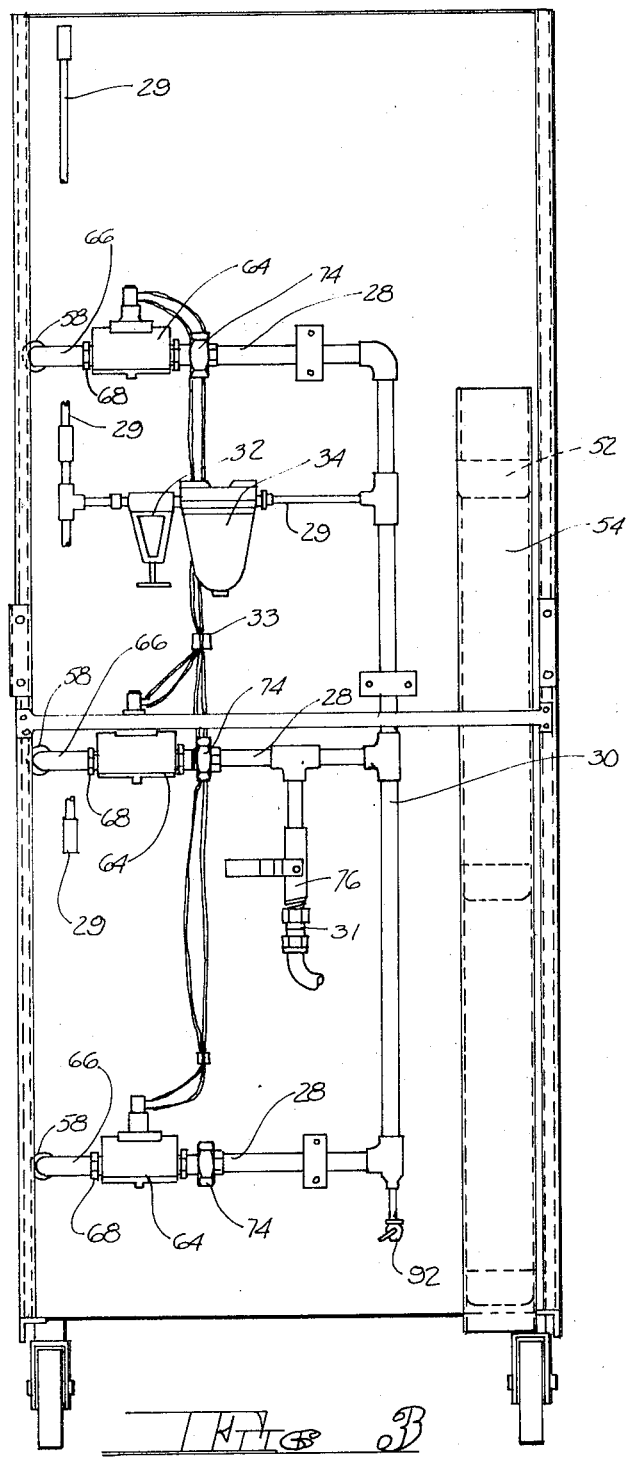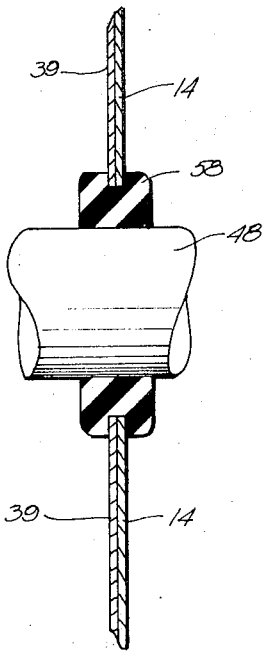

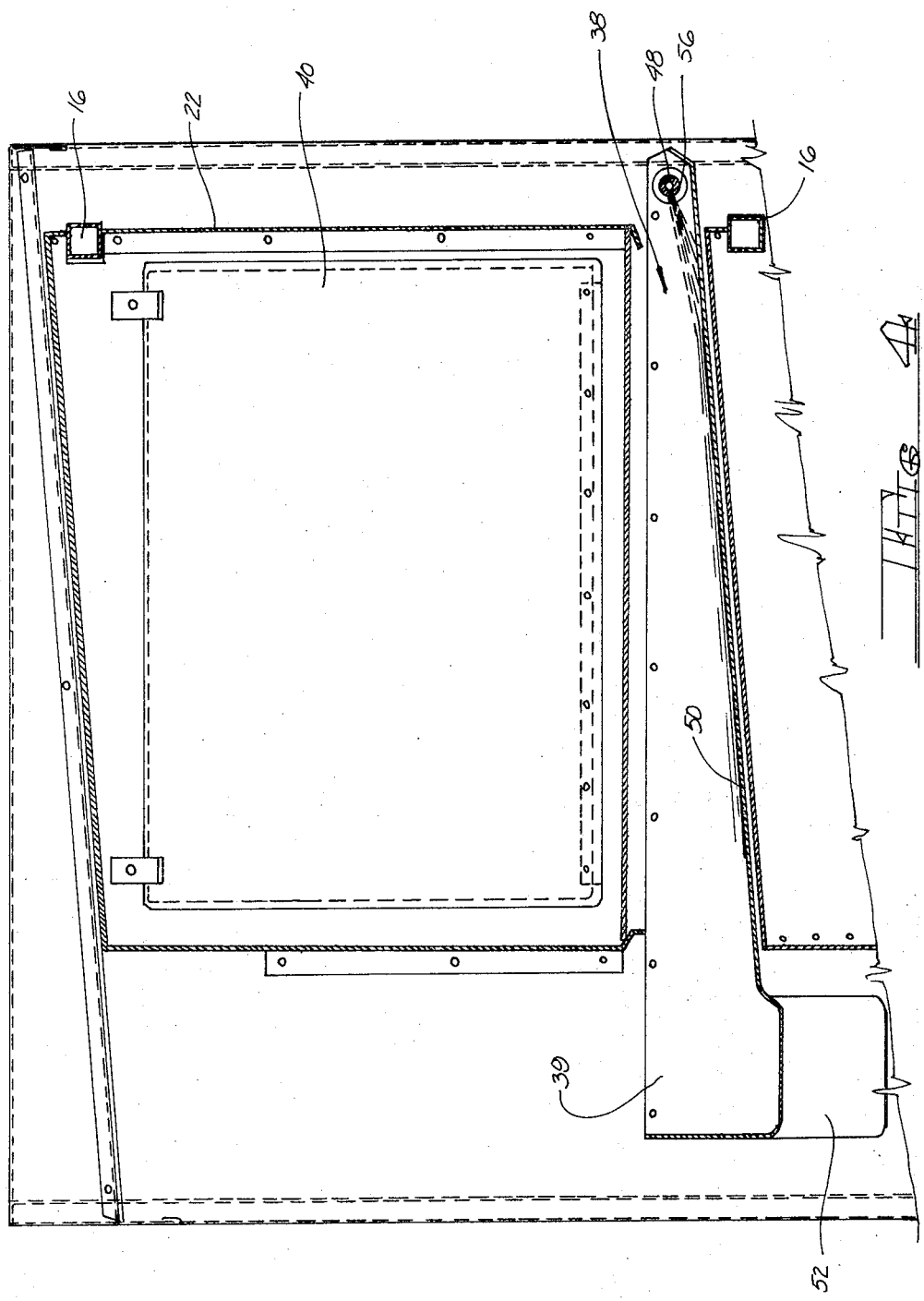

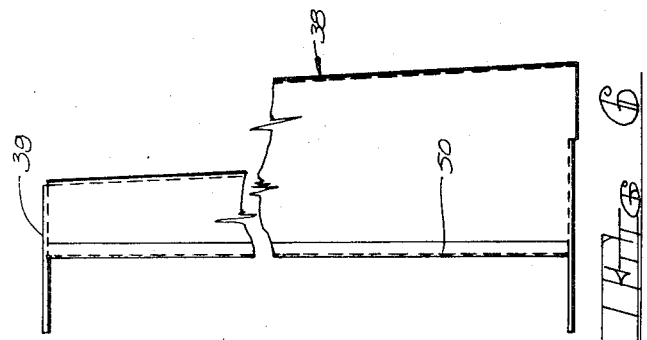
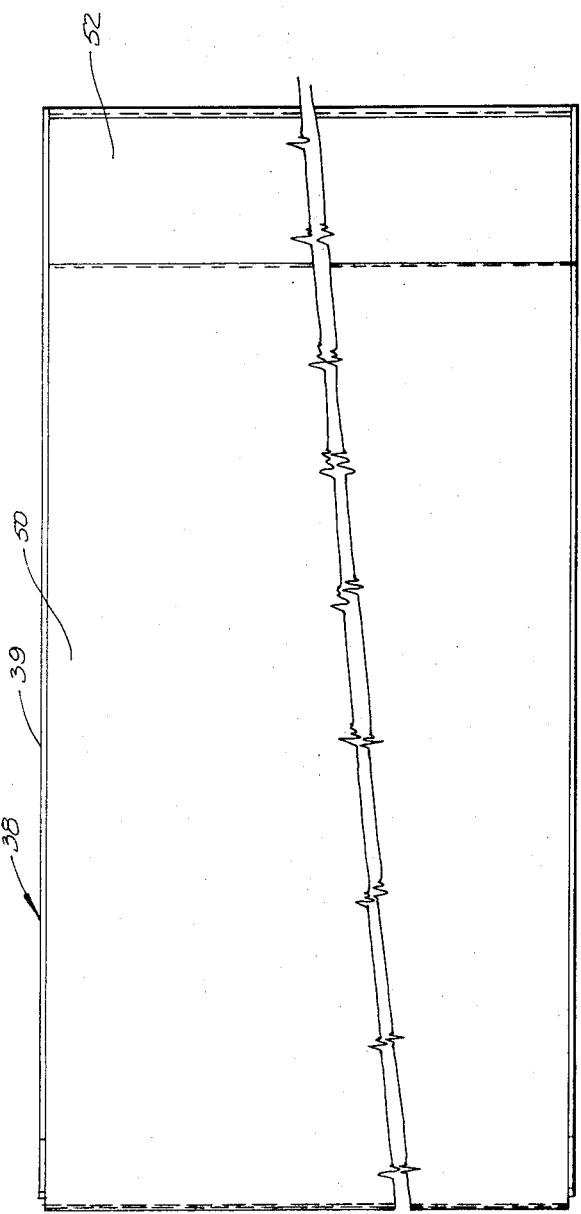
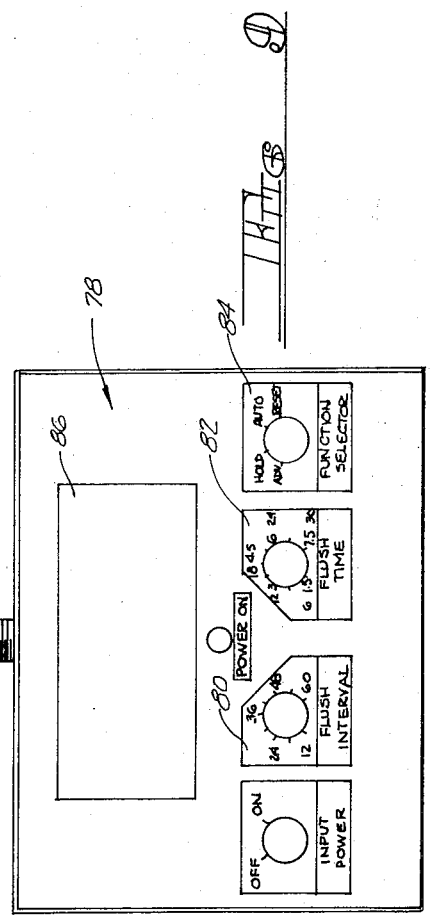

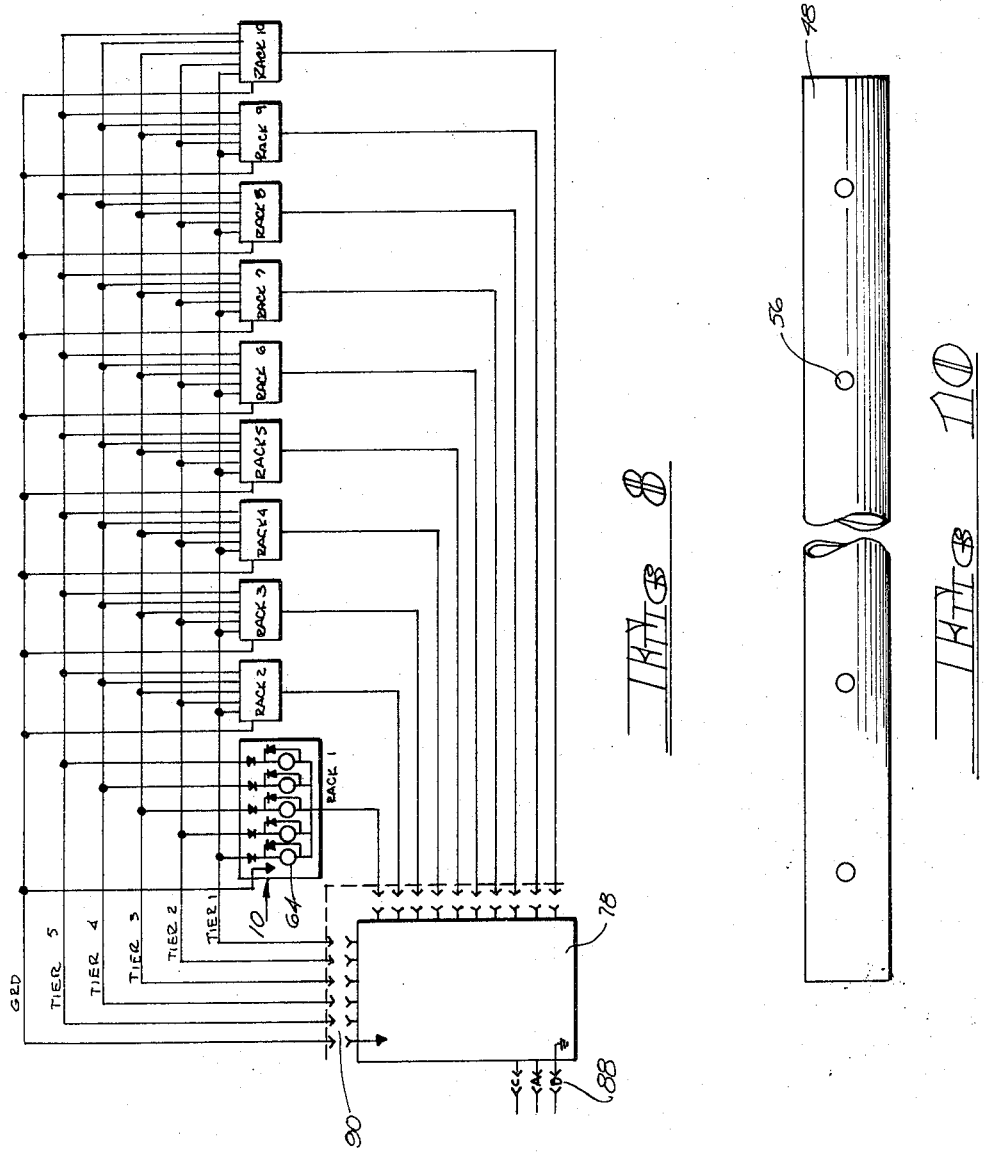

WATER FLUSHING EXCRETA REMOVAL SYSTEM FOR ANIMAL HOUSING SYSTEMS

BACKGROUND OF THE INVENTION

1. Field of the Invention

This invention relates to animal housing systems for all types of laboratory animals such as mice, rats, guinea pigs, hamsters, gerbils, dogs, cats, primates, and the like, which are maintained in laboratory housing conditions, and, more particularly, to an improved water flushing excreta removal system for such animal housing systems.

2. Description of Prior Art

Animal housing systems widely used by many Universities, drug and consmetic firms, private and governmental research facilities and other commercial establishments do not usually incorporate automatic excreta removal systems of any sort. The usual practice of excreta handling is to provide either absorbent bedding or a prepared absorbent liner in a litter pan which is positioned below the caging or enclosures for the animals. In some instances there is no separate litter pan and the cage is equipped with a solid floor onto which the absorbent material is placed.

The apparatus of the prior art may be classified into two distinct applications of a water type flush. The first of these is the gravity type cascade flush which is by far the more practical and efficient of the two prior art applications. This system, which is typically disclosed in U.S. Pat. No. 3,463,123, in the name of E. J. Hoeltge, and entitled *ADJUSTABLE RACK AND WASTE REMOVAL MEANS FOR ANIMAL CAGES*, is fundamentally different from the water flushing system of the present invention in that it relies upon gravity to generate the required water velocities to effectively clean the flush pans. The other system is a pressure type flush system such as disclosed in U.S. Pat. No. 3,658,031, in the name of Sherman Michael Coe, entitled *HOUSING SYSTEM FOR ANIMALS*, and in U.S. Pat. No. 3,269,358, in the name of J. W. Hawley, entitled *TIME OPERATED LABORATORY ANIMAL FEEDING AND HOUSING DEVICE*. However, the pressure type flush system disclosed in these patents has not proven to be effective in cleaning or practicle in operation. Briefly, these systems produce a high velocity spray composed of many streams of water which strike the sloped drain pan and do not always provide an even coverage of water across the flushing area. Further, such streams of water have proven to be ineffectual in removing excreta from the pan. Additionally, such systems have also proven to be prone to spraying the animal enclosure immediately above the flushing pans with an aerosol effect that is detrimential to the health of the animals in the housing systems. Finally, due to the construction of the flushing pans of the prior art pressure type flush systems, the systems have proven to be prone to seaping through the flush tube entrance into the drain pan, causing leakage onto the floor. This is so because the evacuation of effluence is accomplished by a vertical exit through a tube at the lowest corner of the drain pan, which is unable to handle the quantity of water required for adequate flushing. It should also be noted that the prior art drain pans of the pressure type flush systems have not been designed with adequate enough strength to prevent permanent deformation in normal use.

SUMMARY OF THE INVENTION

The present invention provides an improved pressure type flush system for laboratory animal housing systems.

Briefly, the improved pressure type flush system or water flushing excreta removal system of the present invention is for use in an animal housing system of the type having at least one tier of cubicles and an inclined surface disposed beneath the cubicles of each tier adapted to catch debris from the cubicles and provided with flush water supply means for removal of the debris. The inclined surface provides for water flow from the flushing means from the front of the cubicles to the rear of the cubicles, with the flushing means being mounted at the upper end of the inclined surface.

More particularly, the flushing water supply means comprises a flush tube suspended over the front of the inclined surface. The tube contains a number of large diameter holes spaced apart to generate a slow moving, well distributed flushing pattern over the inclined surface and which induces a manifolding effect, thereby substantially eliminating angular deflections and uneven pressure distributions.

A lateral trough is provided sloping downwardly and away from the rear of the inclined surface and leading to a vertical drain conduit. A water flushing solenoid valve is connected by flexible hose to the flush tube. A supply manifold, including one branch for each tier of cubicles, with the branch being connected to a solenoid valve, is connected to a source of water. A throttle-shut-off valve is located upstream of the supply manifold and serves as a shut-off valve for when the animal housing system is dismantled from the water supply and as a flush adjustment.

Finally, control means are provided which furnish timed sequential energization of the water flushing solenoid valves, permitting adjustment of the time interval between flush cycles, the length of tier flush time, and selection of various modes of operation.

The present invention provides a superior pressure type flush system for laboratory housing units which very efficiently removes excreta and other materials, such as unused food, hair, and the like, from beneath an animal housing system. This provides a considerably better environment for the animals, generally resulting in improved animal health.

The pressure type flush system of the present invention also substantially reduces the labor and its incurred cost required by conventional animal housing systems in the maintenance of the animals. Such reduction allows for a larger scale of animal experimentation using the same labor than would be possible using conventional housing and excreta removal systems.

BRIEF DESCRIPTION OF THE DRAWINGS

FIG. 1 is a partial perspective view of a typical laboratory animal housing system which incorporates the improved water flushing excreta removal system of the present invention.

FIG. 2 is a partial front elevational view of the animal housing system of FIG. 1.

FIG. 3 is an end elevational view of the animal housing system as seen from the right in FIG. 2.

FIG. 4 is a cross-sectional view taken on the line 4—4 of FIG. 2.

3

FIG. 5 is a partial plan view of the drain pan of the water flushing excreta removal system of the present invention.

FIG. 6 is a partial end view of the drain pan of FIG. 5.

FIG. 7 is a fragmentary sectional view showing a rubber grommet and flush tube connection through the side of a drain pan.

FIG. 8 is an exemplary wiring diagram for 10 animal housing systems or racks of 5 tiers each, with each rack incorporating the improved water flushing excreta removal system of the present invention.

FIG. 9 is a front elevational view of the control means which will permit adjustment of the time interval between flush cycles, the length of tier flush time, and selection of various modes of operation of the water flushing excreta removal system of the present invention for each rack or a plurality of racks.

FIG. 10 is a partial, front elevational view of a flush tube.

DESCRIPTION OF THE PREFERRED EMBODIMENT

Referring more particularly to the drawings, wherein like numerals indicate like parts, it will be understood that the water flushing excreta removal system of the present invention remains basically the same for different specie of laboratory animals and differs only in the number of flushing drain pans as the housing configuration changes. Furthermore, it will, of course, be understood that while the water flushing excreta removal system of the present invention is described herein in combination with an animal housing system of at least one tier of specifically defined cubicles, that such removal system is not limited in its use to any specifically defined cubical.

In FIGS. 1 through 10 a water flushing excreta removal system for a housing system for animals is shown. The animal housing system 10 comprises several tiers of cubicles supported on end frames 12 and 14. The drinking water supply pipes 16 are fabricated from square tubing and serve as the main structural support member in the front portion of each tier. An individual water supply line 18 enters each individual cubicle and supplys water on a drop-by-drop basis to a vertical tube. As will be more fully explained hereinafter, the flushing system and flush water supply 20 permits automated cleaning of individual flush pans on a scheduled flushing basis, with the capability to program any flush schedule desired.

In FIG. 2 a front view of the animal housing system 10 is shown with the frame end walls 12 and 14 supporting the tubular drinking water supply pipes 16. Wires 22 define the bottom, rear and top of each cubicle. A front panel 24 is hinged for rotation about the hinge 26. The drinking water supply does not form a part of the present invention. However, typically it comprises a vertical tube which is turned inwardly toward the center of the cubicle at its bottom to provide a drop-by-drop supply of water to an animal in the cubicle. Water under pressure is supplied to the pipe line 16 through a branch 29 of the supply manifold 30. Typically, this branch will include a pressure reducing valve 32 which maintains the water supply at a working pressure of approximately 2 pounds per square inch. Additionally, this branch will also generally include a filter 34 which purifies the drinking water.

4

The water supply line 18 receives individual droplets of water which issue from the supply pipes 16. Typically valve means 36 control the amount of water supplied to each tube 18. The end of the supply line 18 may be constricted if desired to insure dropwise introduction of the water. The water which enters this line flows downwardly to the bottom end thereof and is accessible to the animal in the cubicle at that point. Water not consumed by the animal will pass out of the line 18 and fall through the wires 22 forming the bottom of the cubicle to the flush pan 38.

The method of assemblying and fabrication of each tier of cubicles is known in the prior art. In one exemplary method of modular assembly, wires 22 are threaded through perforations located around the periphery of each side wall member 40. The wires 22 are crimped at the end of each tier after being threaded through perforations in each side wall member or divider 40. This configuration permits free rotation of each individual wire to facilitate the automatic cleaning thereof by the movement of the animal in the cubicle. The valve means 36 are connected into the water supply pipe line 16 to provide a water supply for drinking purposes to each cubicle. The front lower frame 42 is attached to each side wall member or divider panel 40 and the front bottom corner thereof and serves to provide support to and properly space the side wall members 40 of each cubicle. The front support strips 44 are attached to the lower front frame member 42, the side members 40 and the water supply pipes 16 to orient the front portion of the cubicle and provide a pivot point or hinge 26 for the front panel 24. The front panel 24 engages the hinge 26 and permits access to the cubicle when desired. A suitable latch 46 serves to hold the front panel 24 securely in the closed position.

It will of course be understood that the aforementioned method of modular assembly is only exemplary and that other methods of assembly may be utilized. For example, a more popular method of assembly would utilize removable caging which in themselves are units which are suspended in the end frames 12 and 14 and supply pipes 16.

In FIG. 4 a cross-section of one cubicle is shown. This cross-section was taken along the line 4—4 of FIG. 2 and shows the relationship between the tiers of cubicles and the flush pan 38. The flush pan 38 is located beneath each cubicle and extends the full length of the tier of cubicles. The flush pan 38 is provided with an inclined surface 50 and a trough member 52. The drain pan 38 is of such shape and construction as to provide for the maintenance of laminar flow of the flush under the entire caging area and then collect the effluence in the trough 52, which slopes downwardly and away from the rear of the inclined surface 50 and leads to a vertical drain conduit 54 mounted on the end frame 14. Droppings and other debris are caught by the inclined surface 50 and may be flushed therefrom by water flowing across the inclined surface 50 from the water supply flush tube 48, which is suspended over the front of the inclined surface and provides for water flow for removal of the debris on the inclined surface from the front of the cubicles to the rear of the cubicles.

As can be seen from FIG. 10, the flush tube 48 contains a relatively small number of large diameter holes 56 spaced apart to generate a slow moving, well distributed flushing pattern over the inclined surface 50 which will induce a manifolding effect, thereby substantially eliminating angular deflections and uneven pressure distributions. Such a flushing pattern, because of its excellent distribution, is considerably more effective than prior art flushing systems. One of the contributing reasons for this improvement in actual flushing efficiency is the diameter of the flush tube (usually 1 inch or 1¼ inch inside diameter as opposed to five-eighths inch or three-fourths inch inside diameter in previous systems) which induces the aforementioned manifolding effect. It has been found that the hole diameter to be employed preferably ranges from three-sixteenths inch to one-fourth inch diameter (as opposed to holes in the approximate range of seven-sixty-fourths inch diameter in previous systems). This size has almost 4 times the area of holes used in the previous systems and flow generated by these holes tend to be considerably slower and of greater quantity. Another practical advantage to this improved system is that because of the hole size the flush tubes 48 are relatively immune to fouling, a common occurance in previous systems.

As can best be seen from FIG. 7, the drain or flush pan 38 is provided with sides 39, which are preferably contiguous with the end frames 12 and 14, and the flush tube 48 is suspended over the inclined surface 50 by two grommets 58 through which it passes at the sides of the drain pan and the end frames. As will be more fully explained hereinafter, this mounting provides for exact positioning of the flush tube 48 and its resultant flush, along with easy replacement of the flush tube.

The food supply for the animal's use may be contained in the feeder 60 which comprises a food trough for holding pellet sized food materials. The trough has a solid wall 62 on the outer side and a plurality of wires strung along the innerside which permits access to the food. The feeder trough 60 may be rotated outwardly to permit easy access and maintenance.

The animal housing system may be assembled in a very efficient and rapid manner. As previously explained, if removable caging is utilized, the caging units may be suspended in the racks, i.e., from the frame comprising the end walls 12 and 14 and the water supply lines 16. However, if the modular form of fabrication is utilized, each tier is put together utilizing several individual divider panels or side walls 40 which form the wall members separating the individual cubicles. The side walls 40 are strung together by a series of wires 22 which are passed through corresponding perforations in each of the individual divider panels. The divider panels may be spread to any dimension, resulting in a cubicle having the proper volume to handle the particular type of animal to be housed therein. The back and top of the cubicle as well as the bottom may be constructed of the wires which are threaded through the perforations in the individual wall members 40. Alternately, solid panels may be used. Each wire is crimped at each end to hold it in place but permit rotation of the wire within its perforations to aid in cleaning debris from the wire.

The water flushing excreta removal system for the animal housing system 10 includes a water flushing solenoid valve 64 connected on its downstream side by a flexible hose 66 and a suitable clamp 68 to each flush tube 48. The supply manifold 30, which is connected through the connection 31 to a source of water, includes one branch 28 for each tier or level of cubicles, with each branch 28 being connected by a suitable union 74 to a solenoid valve 64 on its upstream side.

A throttle-shut-off valve 76 is located upstream of the supply manifold 30 and serves as a shut-off valve for when the animal housing system 10 is disconnected from the water supply and as a flush adjustment for the water leaving the holes 56 in the flush tubes 48.

The solenoid valves 64 may be either internal pilot operated diaphragm or direct acting. They are preferably modified to include a slow closing provision and equipped with such features as required to assure as quiet an operating cycle as possible, so as not to distrub the animals. The solenoid valves 64 are designed for use with low voltage, direct current activation.

As previously indicated, the flush tube 48 is suspended over the drain pan by two-grommets 58 through which it passes at the sides 39 of the flush pan 38 and the end panels 12 and 14. This unique suspension, combined with the flexible hose 66 to the solenoid valves 64, provides for exact positioning of each flush tube 48 and its resultant flush. Additionally, this suspension system provides for easy replacement of each flush tube 48 as an assembly. Furthermore, since there is no metal-to-metal contact between the flushing mechanism and the flush pan 38, capillary action is precluded, thus preventing the dropping of water at the ends of the tubes. This unique suspension also provides a completely water proof mounting which eliminates the side leakage associated with previous systems.

FIG. 9 discloses control means 78 for permitting the adjustment of the time interval between flush cycles, the length of tier flush time, and the selection of various modes of operation. In practice, laboratories and the like may utilize any desired number of animal housing systems or racks 10, with each system having any desired number of tiers. However, with the control means 78, the flush water may be supplied on a time basis to each individual tier of one or more housing systems or racks 10, in a particular sequence, as desired, on a predetermined timed cycle. For example, in any one animal housing system or rack 10 the water may be supplied to the top tier first and run for a period of thirty seconds. This process may continue downwardly, each tier in turn, until all have been flushed. The process is then repeated on a continuous timed sequence for each rack 10. Both the time cycle and the duration of the wash on each pan 38 may, of course, be varied to meet any specific requirements found to be necessary in the use and operation of any animal housing system 10. Factors such as the species of the animal, hardness of the water, pressure of the water, amount of debris to be removed and other similar aspects may be taken into consideration in determining the length and frequency of the wash cycle on each pan 38 of each tier of each system or rack 10 and the frequency of the process for each system or rack 10.

As can be seen from FIG. 9, a typical control means 78 will provide timed sequential energization of water flush in solenoid valves 64 on a maximum of 10 systems or racks 10, with each rack containing five tiers, with one solenoid valve 64 per tier. Accordingly, 50 solenoid valves 64 may be sequentially controlled. Silicon semiconductor components in the control means 78 control all logic and timing functions, while output control to the circuits of solenoid valves 64 is handled by industrial quality relays mounted on replacable plug-in printed circuit boards. External panel controls 80, 82 and 84 permit adjustment of the time interval between flush cycles, the length of flush time of solenoid valves 64, and selection of four modes of operation, respectively. Internally mounted controls provide a choice of two flush time ranges, and adjustments for reduced number of system or rack and tier outputs. When operating the control means 78, visual indication of a specifically energized system or rack 10 and tier solenoid valve 64, is provided by a rectangular read out display panel 86, which lights up showing the system or rack number and the tier number thereof being energized.

FIG. 8 is an exemplary wiring diagram showing the control means 78 when wired to ten systems or racks 10 of five tiers each, with each rack incorporating the water flush excreta removal system of the present invention. As can be seen, the control means 78 is connected at 88 to a suitable input connector and at 90 to a suitable output connector. The arrangement shown for rack 1 is typical for racks 2 through 10.

The following sequence of events represents the operations required to made the water flushing excreta removal system of the present invention operational on a first time basis. With a room incorporating a plurality of animal housing systems or racks 10, each rack is positioned over a drain or trough and two connections are made: one for the water supply at the connection 31 leading into the throttle shut-off valve 76 for each system or rack 10, and the other for the electrical control of the solenoid valves 64 at the electrical connection 33 on each rack. The control means 78 is then manually switched to activate any one of the solenoids 64 on a particular system or rack 10 and the throttle - shut-off valve 76 on that system or rack 10 is adjusted for optimum flow. For example, by opening or closing the throttle shut-off valve 76 when a solenoid valve 64 is activated, it is possible to regulate the flush produced in the flush pan 38 of a flush tube 48. The timer 84 of the control means 78 is then returned to its automatic mode and the setup is complete.

The flushing system described herein is equipped with many features specifically designed for easy maintenance. For example, the flush tube 48 may be readily purged by removing the variable diameter, internal expanding plug on the downstream side. The entire flush tube 48 may be changed if necessary by unclamping it on its upstream side and pulling it out through the grommets 58 which support it. The solenoid valves 64 are removable as an assembly by unclamping the clamp 68 on the downstream side and unthreading the union fitting 74 on the upstream side. The entire flushing system may be drained using a drain cock 92 on the lowest branch 28 of the supply manifold 30. If need be, the entire supply manifold 30, including solenoid valves 64 and their respective assemblies, can be removed from each animal housing system or rack 10 by unclamping the brackets which support this assembly.

While certain preferred embodiments of the invention have been specifically illustrated and described, it is understood the invention is not limited thereto, as many variations will be apparent to those skilled in the art, and the invention is to be given its broadest interpretation within the terms of the following claims.

The embodiments of the invention in which an exclusive property or privilege is claimed are defined as follows:

1. In an animal housing of the type having two or more tiers of cubicles and an inclined surface disposed beneath said cubicles of each tier adapted to catch debris from said cubicles and provided with flush water supply means for removal of said debris, said inclined surface providing for water flow from said flushing means from the front of said cubicles to the rear of said cubicles, said flushing means being mounted at the upper end of said inclined surface, the improvement, in combination therewith, wherein said flush water supply means comprises:
   a. a supply manifold connected to a source of water, said supply manifold including one branch for each tier of said cubicles;
   b. a water flushing solenoid valve connected to each of said branches of said manifold;
   c. a flush tube suspended over the front of said inclined surface and connected to each of said solenoid valves by a flexible hose, said tube containing a number of large diameter holes spaced apart to generate a slow moving, well distributed flushing pattern over said inclined surface and which induces a manifolding effect, thereby substantially eliminating angular deflections and resulting spraying and uneven pressure distributions;
   d. control means which provide timed sequential energization of said water flushing solenoid valves selectively of each of said tiers, permitting adjustment of the time interval between flush cycles of said tiers, the length of flush time of said tiers, and the selection of various modes of operation;
   e. a throttle shut-off valve located upstream of said supply manifold, serving as a shut-off valve for when said animal housing system is disconnected from the water supply and as a flush water pressure adjustment; and
   f. a lateral trough sloping downwardly and away from the rear of said inclined surface and leading to a vertical drain conduit.

2. The animal housing system according to claim 1, wherein said solenoid valves are of the internal pilot operated diaphragm type.

3. The animal housing system according to claim 1, wherein said solenoid valves are of the direct acting type.

4. The animal housing system according to claim 1, wherein said inclined surface comprises a drain pan having sides, and wherein said flush tube is suspended over said inclined surface by two grommets through which it passes at the sides of said drain pan, which, with said flexible hose connection to said solenoid, provide for exact positioning of said flush tube and its resultant flush, for easy replacement of said flush tube, and for no metal to metal contact between said flush water supply means and said drain pan, precluding the dropping of water by capillary action.

5. The animal housing system according to claim 1, wherein said flush tube is closed on its downstream end by a variable diameter, internal expanding plug removable for purposes of cleaning and purging said flush tube.

6. The animal housing system according to claim 1, wherein said vertical drain conduit is mounted on one end of said animal housing system.

7. The animal housing system according to claim 1, wherein said supply manifold, throttle-shut-off valve and said water flushing solenoid valves are positioned on one end of said animal housing system.

* * * * *